(12) United States Patent
Nishimura

(10) Patent No.: US 10,803,331 B2
(45) Date of Patent: Oct. 13, 2020

(54) INFORMATION PROCESSING APPARATUS, INFORMATION PROCESSING METHOD, AND INFORMATION PROCESSING SYSTEM

(71) Applicant: TOYOTA JIDOSHA KABUSHIKI KAISHA, Toyota-shi, Aichi-ken (JP)

(72) Inventor: Kazuya Nishimura, Okazaki (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 147 days.

(21) Appl. No.: 16/003,821

(22) Filed: Jun. 8, 2018

(65) Prior Publication Data
US 2019/0026573 A1    Jan. 24, 2019

(30) Foreign Application Priority Data
Jul. 20, 2017 (JP) ................. 2017-141214

(51) Int. Cl.
G06K 9/00    (2006.01)
G08G 1/14    (2006.01)
G06K 9/46    (2006.01)

(52) U.S. Cl.
CPC ..... *G06K 9/00812* (2013.01); *G06K 9/00791* (2013.01); *G06K 9/4661* (2013.01); *G08G 1/14* (2013.01)

(58) Field of Classification Search
None
See application file for complete search history.

(56) References Cited

U.S. PATENT DOCUMENTS

| | | | |
|---|---|---|---|
| 2007/0124064 A1 | 5/2007 | Fukui et al. | |
| 2015/0287121 A1 | 10/2015 | Nakamura | |
| 2017/0069201 A1* | 3/2017 | Sedlik | B60W 40/04 |
| 2019/0257659 A1* | 8/2019 | Moteki | G09B 29/00 |

FOREIGN PATENT DOCUMENTS

| | | |
|---|---|---|
| CN | 105718470 A | 6/2016 |
| JP | 2007147567 A | 6/2007 |
| JP | 2008128658 A | 6/2008 |
| JP | 2010164688 A | 7/2010 |
| JP | 2014085760 A | 5/2014 |

* cited by examiner

*Primary Examiner* — Fan Zhang
(74) *Attorney, Agent, or Firm* — Hunton Andrews Kurth LLP

(57) ABSTRACT

An information processing apparatus is configured to perform communication with an in-vehicle device mounted in a vehicle. The information processing apparatus includes at least one computer that is configured to acquire vehicle information including a position of the vehicle through communication with the in-vehicle device, acquire an image captured at a predetermined position with an imaging device mounted in the vehicle based on the vehicle information through communication with the in-vehicle device, and detect change in situations at the predetermined position based on the image.

15 Claims, 13 Drawing Sheets

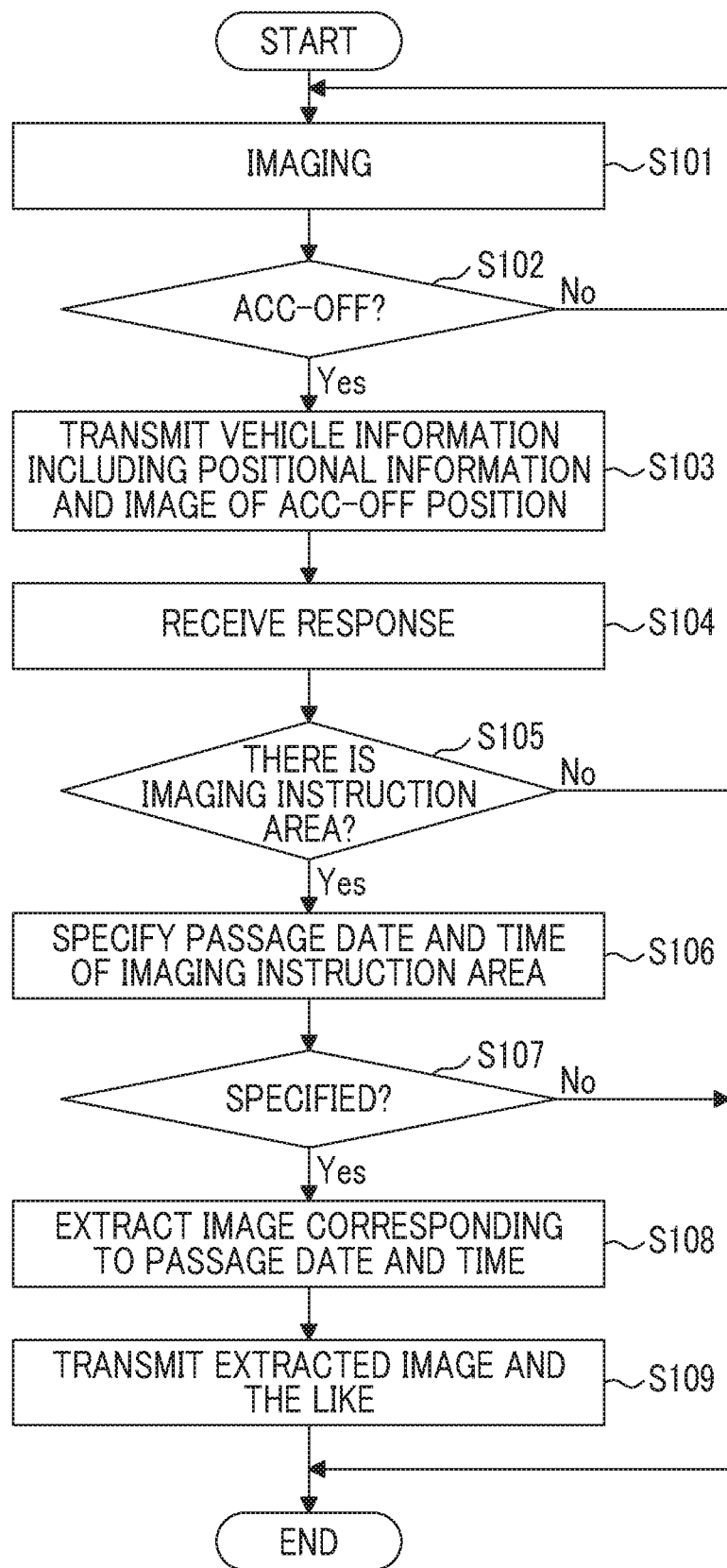

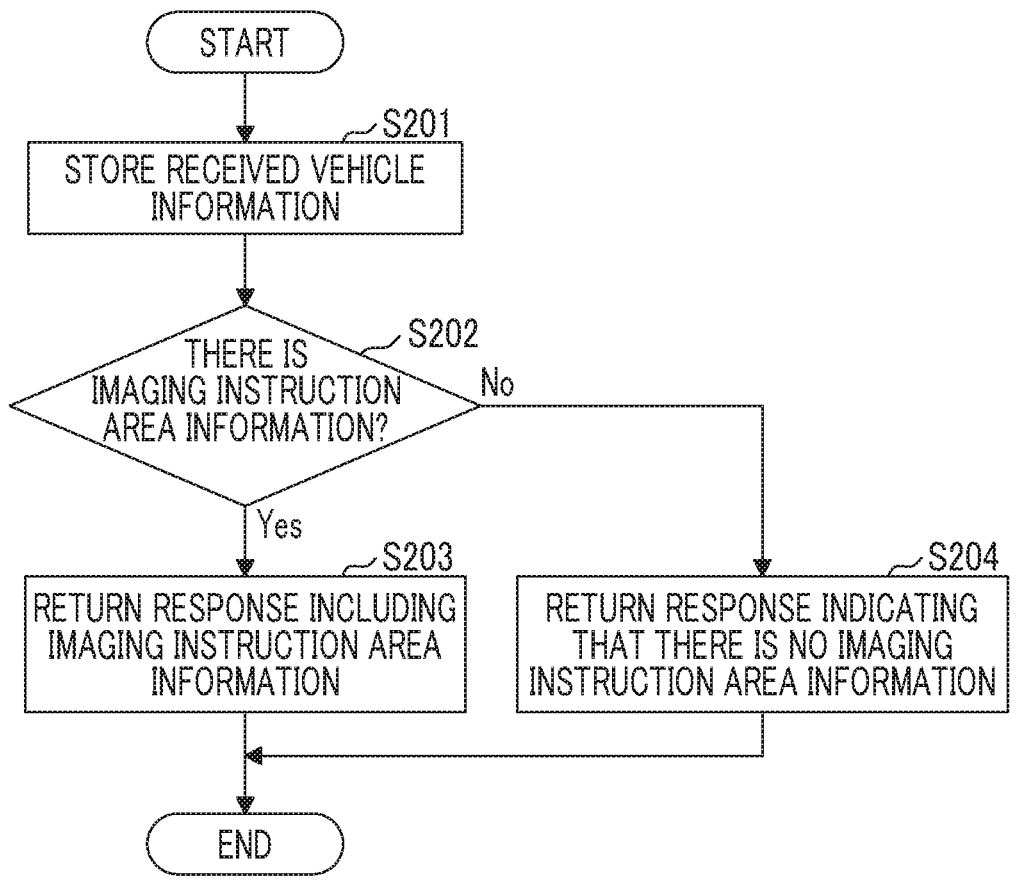

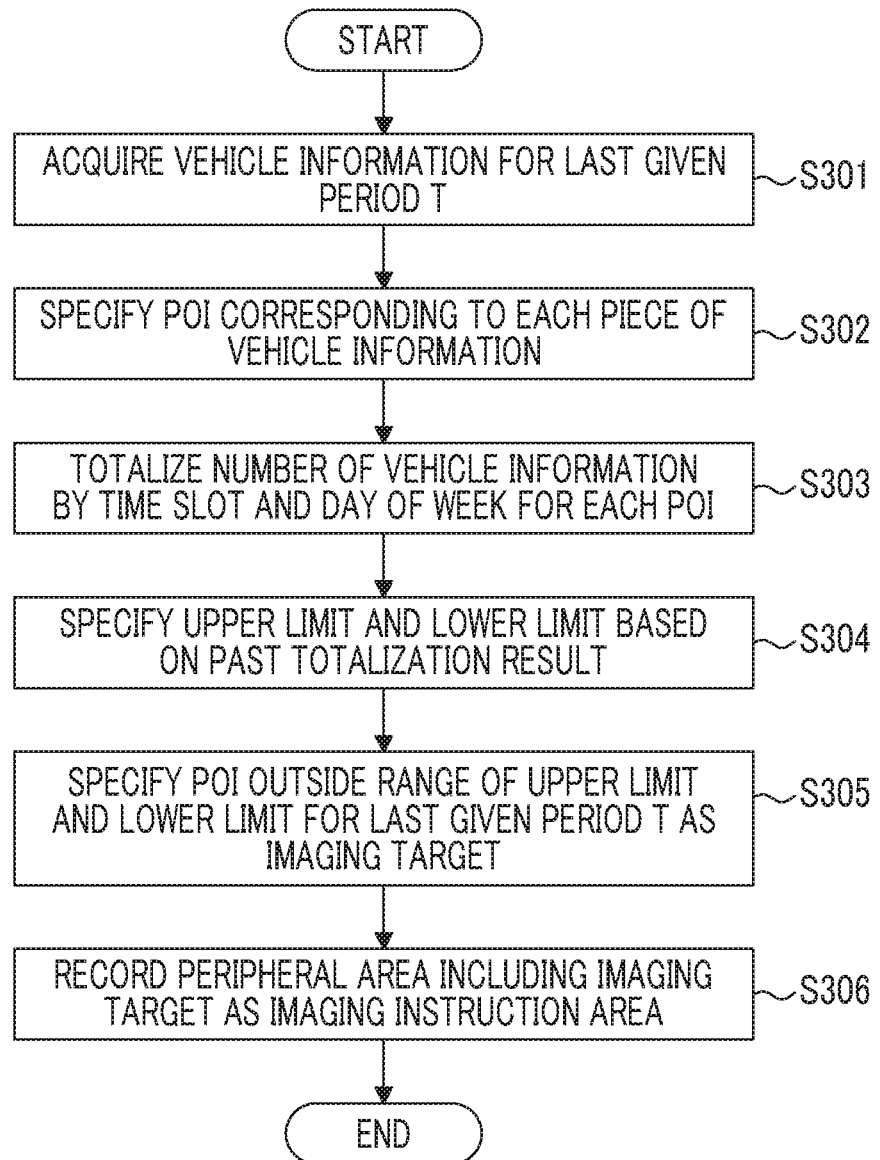

FIG. 9

| POI_ID | TIME SLOT CLASSIFICATION | DAY-OF-WEEK CLASSIFICATION | NUMBER OF VEHICLES IN ACC-OFF STATE | VEHICLE ID ARRAY | NUMBER OF VEHICLES IN ACC-OFF STATE |
|---|---|---|---|---|---|
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| ⋯ | ⋯ | ⋯ | ⋯ | ⋯ | ⋯ |

| POI_ID | AREA RANGE | PRIORITY |
|---|---|---|
| ... | ... | ... |
| ... | ... | ... |
| ... | ... | ... |
| ... | ... | ... |
| : | : | : |

FIG. 12

| POI_ID | BRIGHTNESS VALUE 1 (MORNING OF BUSINESS DAY) | BRIGHTNESS VALUE 2 (EVENING OF BUSINESS DAY) | BRIGHTNESS VALUE 3 (MORNING OF CLOSING DAY) | BRIGHTNESS VALUE 4 (EVENING OF CLOSING DAY) |
|---|---|---|---|---|
| ... | ... | ... | ... | ... |
| ... | ... | ... | ... | ... |
| ... | ... | ... | ... | ... |
| : | : | : | : | : |

FIG. 13

| POI_ID | CHANGE IN BRIGHTNESS VALUE | NUMBER OF PARKED VEHICLES | NUMBER OF PEDESTRIANS | DATE AND TIME |
|---|---|---|---|---|
| ... | ... | ... | ... | ... |
| ... | ... | ... | ... | ... |
| ... | ... | ... | ... | ... |
| : | : | : | : | : |

FIG. 15

| CHANGE IN BRIGHTNESS VALUE | COEFFICIENT |
|---|---|
| PRESENT | −2 |
| UNCLEAR | 0 |
| ABSENT | +2 |

C1

| NUMBER OF PARKED VEHICLES | COEFFICIENT |
|---|---|
| EQUAL TO OR GREATER THAN X | −1 |
| LESS THAN X | 0 |
| 0 | +1 |

C2

| NUMBER OF PEDESTRIANS | COEFFICIENT |
|---|---|
| EQUAL TO OR GREATER THAN Y | −1 |
| LESS THAN Y | 0 |
| 0 | +1 |

C3

INFORMATION PROCESSING APPARATUS, INFORMATION PROCESSING METHOD, AND INFORMATION PROCESSING SYSTEM

INCORPORATION BY REFERENCE

The disclosure of Japanese Patent Application No. 2017-141214 filed on Jul. 20, 2017 including the specification, drawings and abstract is incorporated herein by reference in its entirety.

BACKGROUND

1. Technical Field

The present disclosure relates to an information processing apparatus, an information processing method, and an information processing system.

2. Description of Related Art

For example, a store, such as a gas station or a convenience store, that is in business several days before may go out of business suddenly and may become a different store. In the case described above, a current navigation system updates data of a point of interest (POI) in map information based on information collected manually. For this reason, freshness of POI information may get old with respect to an actual situation.

A method that, for a geographic object, determines whether or not the geographic object is to be erased from a map based on whether or not time-series change in the number of occurrences in a search result of a search engine conforms to a rule that does not support the presence of the geographic object has been suggested (for example, Japanese Unexamined Patent Application Publication No. 2010-164688 (JP 2010-164688 A)).

SUMMARY

However, in JP 2010-164688 A, information of an out-of-business store in the search engine is not always reflected immediately on a web as an information source of the search engine. There are a large number of stores, such as gas stations or convenience stores, and it is difficult to specify a specific store with web information. Accordingly, it is difficult to detect going out-of-business of the specific store with relatively high accuracy.

The present disclosure provides an information processing apparatus, an information processing method, and an information processing system that improve detection accuracy of change in situations of a predetermined position.

A first aspect of the present disclosure relates to an information processing apparatus configured to perform communication with an in-vehicle device mounted in a vehicle. The information processing apparatus includes at least one computer configured to acquire vehicle information including a position of the vehicle through communication with the in-vehicle device, acquire an image captured at a predetermined position with an imaging device mounted in the vehicle based on the vehicle information through communication with the in-vehicle device, and detect change in situations at the predetermined position based on the image.

For this reason, it is possible to detect change in situations at the predetermined position based on an image relating to the predetermined position where change in situations is estimated based on the vehicle information.

Accordingly, it is possible to improve the detection accuracy of change in situations at the predetermined position.

In the information processing apparatus according to the first aspect of the present disclosure, the predetermined position may be a position in the vicinity of a point where there is a target that a user of the information processing apparatus requests guidance.

For this reason, it is possible to detect change in situations at the predetermined position based on an image relating to the vicinity of the point where change in situations is estimated based on the vehicle information and there is the target that the user of the information processing apparatus requests guidance.

Accordingly, it is possible to improve the detection accuracy of change in situations relating to a facility or the like where there is the target that the user of the information processing apparatus requests guidance.

In the information processing apparatus according to the first aspect of the present disclosure, the predetermined position may be a position where there is the target that the user of the information processing apparatus requests the guidance.

For this reason, it is possible to detect change in situations at the point based on an image relating to the vicinity of the point where change in situations is estimated based on the vehicle information and there is the target that the user of the information processing apparatus requests guidance.

Accordingly, it is possible to improve the detection accuracy of change in situations relating to a facility or the like where there is the target that the user of the information processing apparatus requests guidance.

In the information processing apparatus according to the first aspect of the present disclosure, the vehicle information may include positional information of a position where the vehicle is parked. The computer may be configured to specify the predetermined position based on the positional information of the position where the vehicle is parked.

At the time of using a certain facility or the like, parking of the vehicle is performed in the vicinity of the facility. Then, the position where the vehicle is parked is considered to indicate the position of the used facility or the like.

Accordingly, it is possible to improve the detection accuracy of change in situations relating to the facility or the like based on the use situations of the facility or the like.

In the information processing apparatus according to the first aspect of the present disclosure, the computer may be configured to specify a position where a frequency of parking tends to decrease based on a history of positional information of the position where the vehicle is parked. The computer may be configured to notify the in-vehicle device of the position where the frequency of parking tends to decrease as the predetermined position.

Here, in a facility or the like where the frequency of parking tends to decrease, a decrease in use frequency is presumed. As the factor of the decrease in use frequency, a possibility of change in situations, such as going out-of-business of the facility, is presumed.

Accordingly, it is possible to define an image of a facility or the like with a high possibility of change in situations as a processing target, and to expect reduction in processing load or the like.

In the information processing apparatus according to the first aspect of the present disclosure, the computer may be configured to detect change in situations at the predetermined position based on at least one of a brightness value of the image, the number of parked vehicles extracted from the image, and the number of pedestrians extracted from the image.

For this reason, even in a state in which there is a building, such as a facility, it is possible to detect change in situations, such as going out-of-business of the facility, based on the brightness value (lightness) of the facility or the like, the number of parked vehicles in the facility, the number of pedestrians in the vicinity of the facility, and the like.

Accordingly, it is possible to improve the detection accuracy of change in situations at the predetermined position.

A second aspect of the present disclosure relates to an information processing method. The information processing method includes, with an information processing apparatus configured to perform communication with an in-vehicle device mounted in a vehicle, acquiring vehicle information including a position of the vehicle, acquiring an image captured at a predetermined position with an imaging device mounted in the vehicle based on the vehicle information from the in-vehicle device with the information processing apparatus, and detecting change in situations at the predetermined position based on the image acquired at the predetermined position.

For this reason, it is possible to detect change in situations at the predetermined position based on an image relating to the predetermined position where change in situations is estimated based on the vehicle information.

Accordingly, it is possible to improve the detection accuracy of change in situations at the predetermined position.

A third aspect of the present disclosure relates to an information processing system. The information processing system includes an in-vehicle device mounted in a vehicle, and an information processing apparatus configured to perform communication with the in-vehicle device. The information processing apparatus includes at least one computer configured to acquire vehicle information including a position of the vehicle through communication with the in-vehicle device, acquire an image captured at a predetermined position with an imaging device mounted in the vehicle based on the vehicle information through communication with the in-vehicle device, and detect change in situations at the predetermined position based on the image.

For this reason, it is possible to detect change in situations at the predetermined position based on an image relating to the predetermined position where change in situations is estimated based on the vehicle information.

Accordingly, it is possible to improve the detection accuracy of change in situations at the predetermined position.

It is possible to improve the detection accuracy of change in situations relating to the facility or the like.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5 is a flowchart illustrating an example of a processing procedure that the in-vehicle device executes;

FIG. 6 is a flowchart illustrating an example of a processing procedure that the center executes with reception of vehicle information;

FIG. 7 is a table showing a configuration example of a vehicle information storage unit;

FIG. 8 is a flowchart illustrating an example of a processing procedure of specification processing of an imaging instruction area;

FIG. 9 is a table showing a configuration example of a totalization result storage unit;

FIG. 12 shows a configuration example of a brightness value table;

FIG. 13 shows a configuration example of a situation table;

FIG. 15 is a table showing a configuration example of a coefficient storage unit.

DETAILED DESCRIPTION OF EMBODIMENTS

Figure 1:
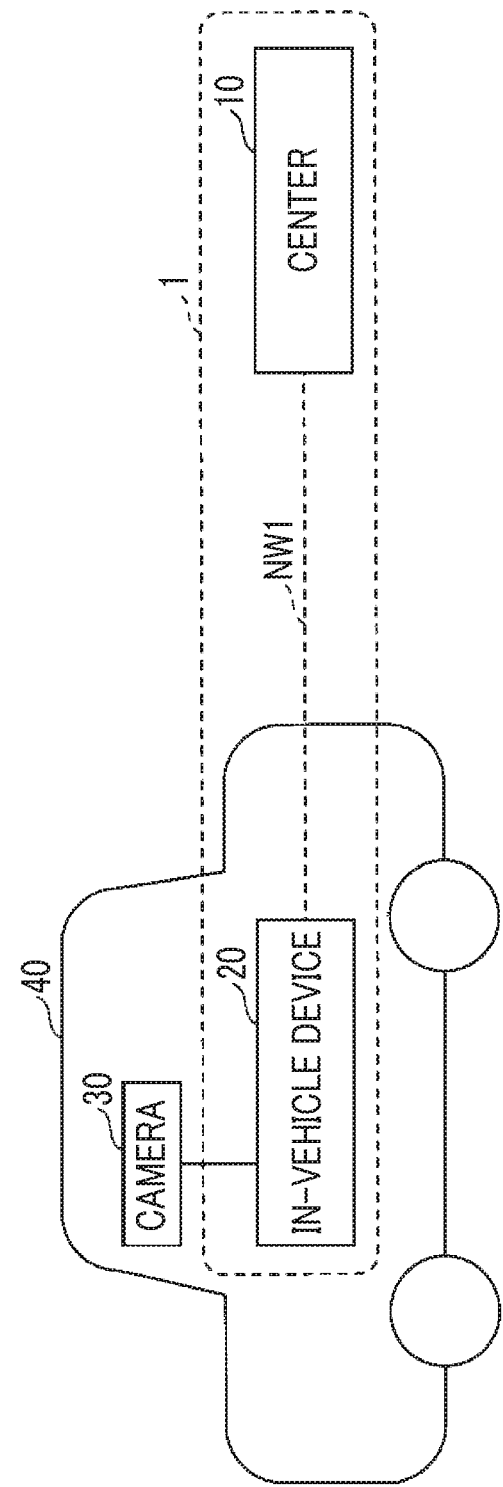
FIG. 1 is a diagram showing a configuration example of an information processing system according to an embodiment of the present disclosure.

Hereinafter, an embodiment of the present disclosure will be described referring to the drawings. FIG. 1 is a diagram showing a configuration example of an information processing system 1 according to the embodiment of the present disclosure. In FIG. 1, the information processing system 1 includes an in-vehicle device 20 and a center 10. The in-vehicle device 20 and the center 10 can perform communication through a predetermined communication network NW1 including a mobile communication network (wireless communication network) with a large number of base stations as terminals, the Internet, or the like. In FIG. 1, for convenience, solely one vehicle 40 is shown; however, the in-vehicle device 20 of each of a plurality of vehicles 40 can perform communication with the center 10 through the communication network NW1.

The in-vehicle device 20 is a device that is mounted in the vehicle 40 and has an information processing function and a communication function. For example, the in-vehicle device 20 may include a navigation system. In the embodiment, the in-vehicle device 20 is connected to a camera 30 provided in the vehicle 40 so as to capture an image forward of the vehicle 40, and receives an image captured by the camera 30 as input. The camera 30 may be, for example, a camera that is provided for the purpose of a drive recorder or driving assistance.

The center 10 is a set of one or more computers (information processing apparatuses). In the embodiment, the center 10 performs processing for detecting change in situations at a predetermined position using an image captured at the predetermined position by the camera 30 of each vehicle 40 based on vehicle information collected from the in-vehicle device 20 of each vehicle 40.

Figure 2:
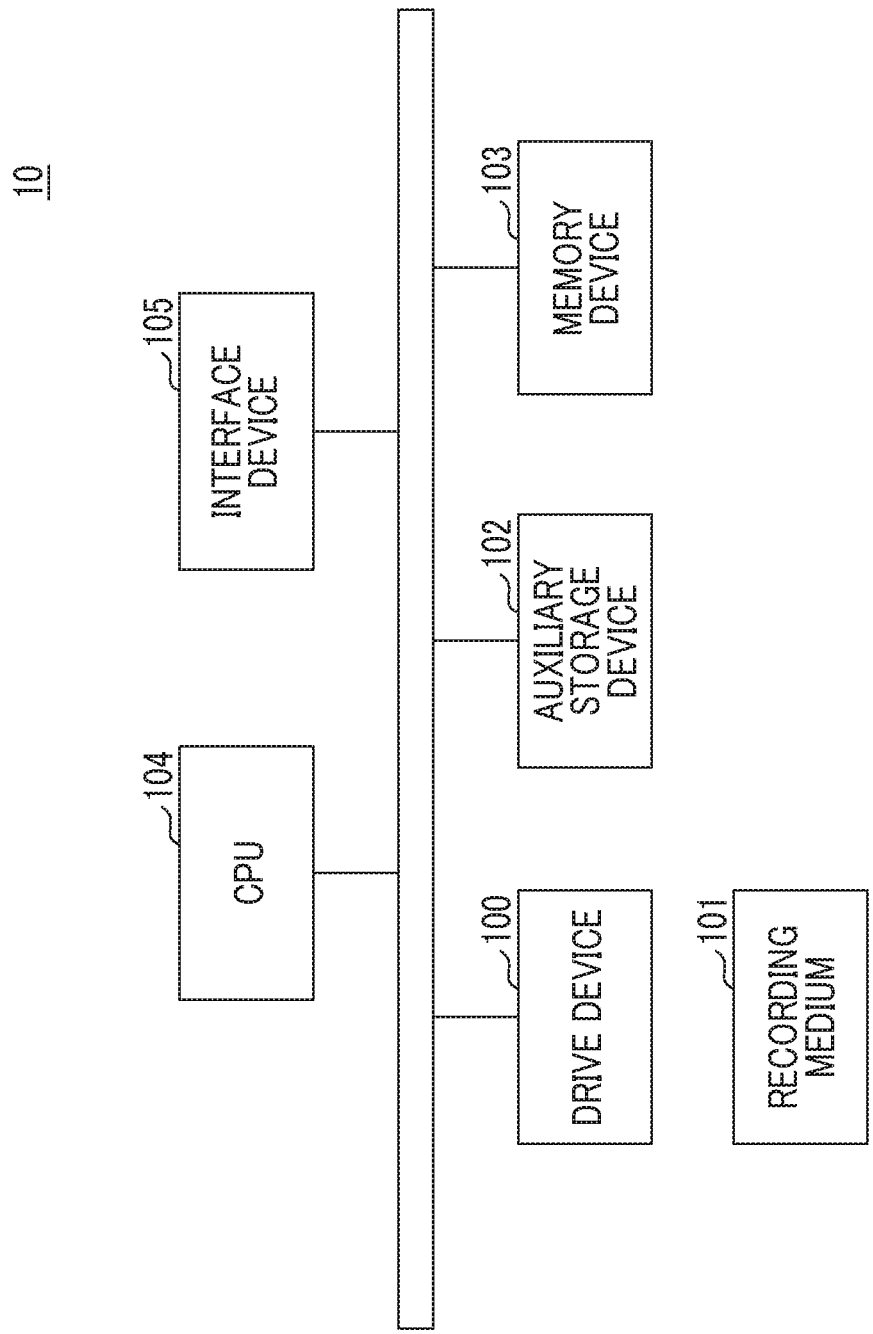
FIG. 2 is a diagram showing a hardware configuration example of a center according to the embodiment of the present disclosure.

FIG. 2 is a diagram showing a hardware configuration example of the center 10 according to the embodiment of the present disclosure. The center 10 of FIG. 2 has a drive device 100, an auxiliary storage device 102, a memory device 103, a central processing unit (CPU) 104, an interface device 105, and the like.

A program that realizes processing in the center 10 is provided through a recording medium 101, such as a CD-ROM (Read Only Memory). In a case where the recording medium 101 storing the program is set in the drive device 100, the program is installed on the auxiliary storage device 102 from the recording medium 101 through the drive device 100. However, the installation of the program does not need to be performed from the recording medium 101, and the program may be downloaded from another computer through the network. The auxiliary storage device 102 stores the installed program, and stores needed files, data, or the like.

The memory device 103 reads the program from the auxiliary storage device 102 and stores the program in a case where there is a start instruction of the program. The CPU 104 executes functions relates to the center 10 according to the program stored in the memory device 103. The interface device 105 is used as an interface for connection to the network.

Figure 3:
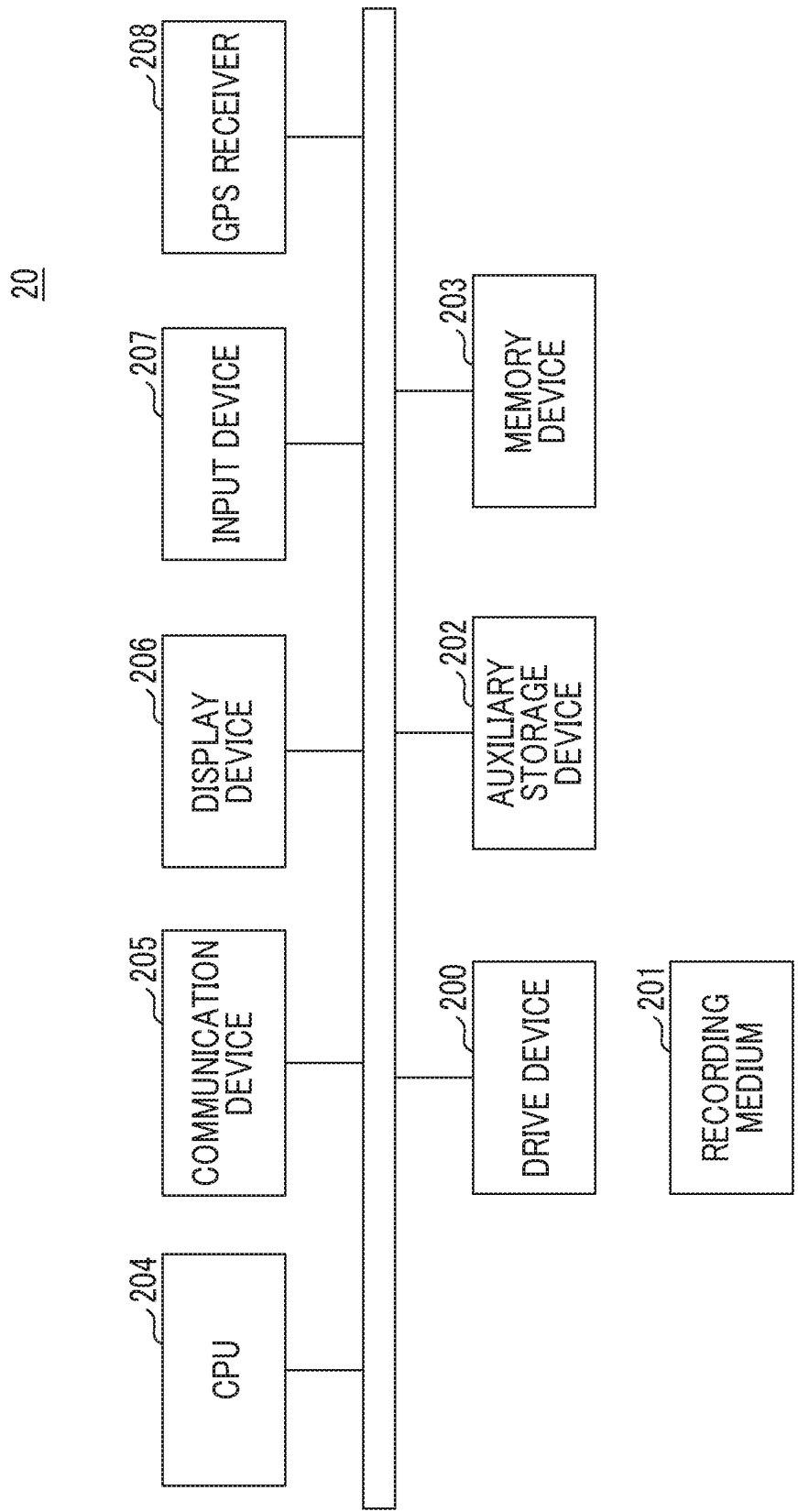
FIG. 3 is a diagram showing a hardware configuration example of an in-vehicle device according to the embodiment of the present disclosure.

FIG. 3 is a diagram showing a hardware configuration example of the in-vehicle device 20 according to the embodiment of the present disclosure. The in-vehicle device 20 of the FIG. 3 has a drive device 200, an auxiliary storage device 202, a memory device 203, a CPU 204, a communication device 205, a display device 206, an input device 207, a GPS receiver 208, and the like.

A program that realizes processing in the in-vehicle device 20 is provided through a recording medium 201, such as an SD memory card. In a case where the recording medium 201 storing the program is set in the drive device 200, the program is installed on the auxiliary storage device 202 from the recording medium 201 through the drive device 200. However, the installation of the program does not need to be performed from the recording medium 201, and the program may be downloaded from another computer through the network. The auxiliary storage device 202 stores the installed program, and stores needed files, data, or the like.

The memory device 203 reads the program from the auxiliary storage device 202 and stores the program in a case where there is a start instruction of the program. The CPU 204 realizes functions related to the in-vehicle device 20 according to the program stored in the memory device 203. The communication device 205 is a device for connection to the network through wireless communication. The communication device 205 may be realized using, for example, a data communication module (DCM). The display device 206 is, for example, a liquid crystal display or the like, and displays a graphical user interface (GUI) or the like by the program. The input device 207 is used to allow a user to input various operation instructions. For example, the input device 207 may be a touch panel. The GPS receiver 208 receives GPS signals transmitted from global positioning system (GPS) satellites and measures a current position of the vehicle 40 based on the GPS signals.

Figure 4:
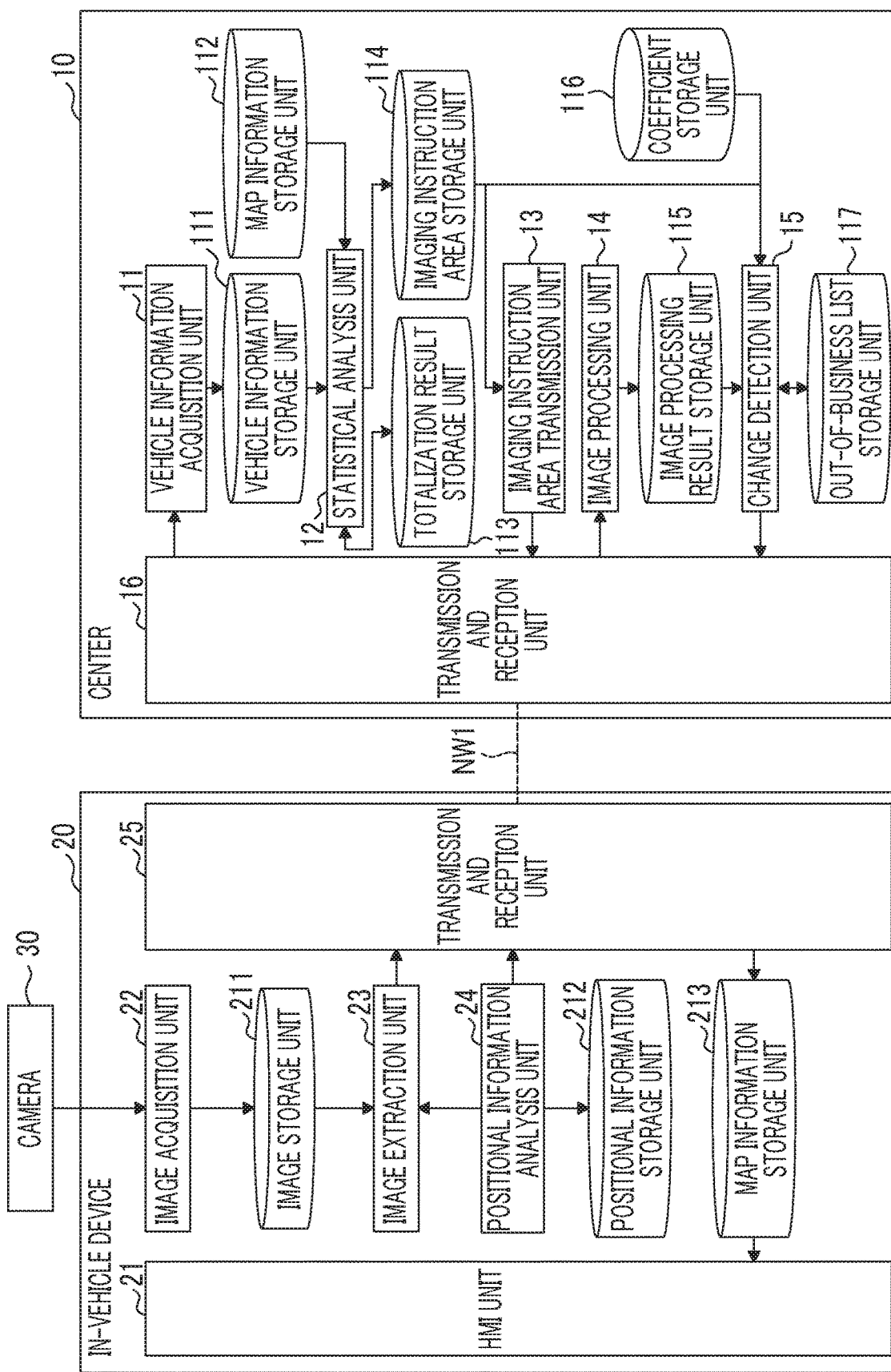
FIG. 4 is a diagram showing a functional configuration example of the in-vehicle device and the center according to the embodiment of the present disclosure.

FIG. 4 is a diagram showing a functional configuration example of the in-vehicle device 20 and the center 10 according to the embodiment of the present disclosure. In FIG. 4, the in-vehicle device 20 includes an HMI unit 21, an image acquisition unit 22, an image extraction unit 23, a positional information analysis unit 24, a transmission and reception unit 25, and the like. The units are realized by processing that is performed on the CPU 204 by one or more programs installed on the in-vehicle device 20. The in-vehicle device 20 further has an image storage unit 211, a positional information storage unit 212, a map information storage unit 213, and the like. The storage units can be realized using, for example, the memory device 203, the auxiliary storage device 202, or the like.

The HMI unit 21 realizes a human machine interface (HMI) that notifies the user (a driver or the like) of a position or a place (for example, a point of interest (POI) or the like) where change is likely to occur through the display device 206 or the like of the in-vehicle device 20. The change is, for example, going out-of-business (discontinuation of business) or the like of a store or a facility. The POI is an example of a point (that is, a point to be a candidate of a destination) to be a target of guidance in the navigation system, like a store, a facility, or the like.

The image acquisition unit 22 acquires an image captured by the camera 30 in a predetermined format, and stores the image in the image storage unit 211 in a moving image format, such as MP4.

The image extraction unit 23 extracts a still image corresponding to the date and time designated from the positional information analysis unit 24 from the moving image stored in the image storage unit 211, and transmits the still image or the like to the center 10.

The positional information analysis unit 24 records positional information measured by the GPS receiver 208 in the positional information storage unit 212 at a given time interval in a state in which an accessory power supply of the vehicle 40 is on (ACC-ON (ACCESSORY-ON)). In a case where an operation (hereinafter, referred to as "ACC-OFF (ACCESSORY-OFF)") to turn off the accessory power supply occurs in the vehicle 40, the positional information analysis unit 24 acquires positional information of an occurrence point of ACC-OFF from the GPS receiver 208, and transmits vehicle information including the positional information to the center 10. The positional information has a meaning as information indicating a position where the vehicle 40 is estimated to be parked. In addition, in a case where information indicating an area (hereinafter, referred to as an "imaging instruction area") designated as an imaging range by the center 10 is received from the center 10, the positional information analysis unit 24 specifies the date and time during traveling in the imaging instruction area with reference to the positional information storage unit 212, and requests the image extraction unit 23 to transmit the still image corresponding to the date and time to the center 10.

The map information storage unit 213 stores map information that is used in the navigation system. The map information also includes POI information or the like.

The transmission and reception unit 25 controls communication with the in-vehicle device 20 and the center 10.

The center 10 has a vehicle information acquisition unit 11, a statistical analysis unit 12, an imaging instruction area transmission unit 13, an image processing unit 14, a change detection unit 15, a transmission and reception unit 16, and the like. The units are realized by processing that is performed on the CPU 104 by one or more programs installed on the center 10. The center 10 uses a vehicle information storage unit 111, a map information storage unit 112, a totalization result storage unit 113, an imaging instruction area storage unit 114, an image processing result storage unit 115, a coefficient storage unit 116, an out-of-business list storage unit 117, and the like. The storage units can be realized using a storage device or the like connectable to the auxiliary storage device 102 in the center 10 or the center 10 through the network.

The vehicle information acquisition unit 11 receives the vehicle information including the positional information of the vehicle 40 transmitted from the in-vehicle device 20 of the vehicle 40 when ACC-OFF occurs in the vehicle 40, and stores the vehicle information in the vehicle information storage unit 111. Accordingly, the vehicle information storage unit 111 stores a history of positional information of an ACC-OFF point of each vehicle 40.

The statistical analysis unit 12 specifies a position (POI) where a frequency of ACC-OFF tends to decrease based on the vehicle information stored in the vehicle information storage unit 111, the map information stored in the map information storage unit 112, and the like, and specifies a peripheral area including the specified POI as an imaging instruction area. Information indicating the imaging instruction area is stored in the imaging instruction area storage unit 114. The totalization result storage unit 113 stores a result of totalization processing of vehicle information that is performed for allowing the statistical analysis unit 12 to specify the POI where the frequency of ACC-OFF tends to decrease.

The imaging instruction area transmission unit 13 transmits information indicating the imaging instruction area to the in-vehicle device 20 of each vehicle 40.

The image processing unit 14 detects change in lightness (brightness value), the number of parked vehicles, the number of pedestrians, and the like from an image captured by each vehicle 40 in the imaging instruction area, and stores a detection result in the image processing result storage unit 115.

The change detection unit 15 detects change in situations (remodeling or going out-of-business of a POI) in each imaging instruction area based on information stored in the image processing result storage unit 115 and a coefficient stored in the coefficient storage unit 116 according to each of change in lightness (brightness value), the number of parked vehicles, and the number of pedestrians. The change detection unit 15 records a POI related to the imaging instruction area with change detected in the out-of-business list storage unit 117.

The transmission and reception unit 16 controls communication between the in-vehicle device 20 and the center 10.

Hereinafter, a processing procedure that is executed by the in-vehicle device 20 or the center 10 will be described. FIG. 5 is a flowchart illustrating an example of a processing procedure that is executed by the in-vehicle device 20.

When the vehicle 40 is in an ACC-ON state (for example, while the vehicle 40 is traveling or stopped due to waiting for a traffic signal, or the like), the image acquisition unit 22 continuously acquires a moving image captured by the camera 30 and stores the moving image in the image storage unit 211 (S101). The moving image includes date and time information. In a case where the capacity of the image storage unit 211 is about to be short, overwriting may be performed to a moving image having old imaging timing. In parallel with storing the moving image, the positional information analysis unit 24 records the positional information indicating the current position of the vehicle 40 and information indicating a current traveling direction of the vehicle 40 in the positional information storage unit 212 at regular intervals in association with current date and time information. The positional information is measured by the GPS receiver 208.

In a case where the vehicle 40 is stopped and the occurrence of ACC-OFF is detected (in S102, Yes), the positional information analysis unit 24 transmits, to the center 10, the vehicle information including the positional information (latitude and longitude) of the current point (that is, parking position) of the vehicle 40 measured by the GPS receiver 208, the still image corresponding to the current position, and an ID (hereinafter, referred to as a "vehicle ID") of the vehicle 40 (S103). In regard to the vehicle ID, any kind of information may be used as long as information allows distinction among the vehicles 40. An image corresponding to the current position can be acquired by extracting a still image corresponding to a current time from the moving image stored in the image storage unit 211.

The positional information analysis unit 24 receives a response from the center 10 (S104). That is, in a case where the positional information is received from the in-vehicle device 20, the center 10 confirms the presence or absence of an imaging instruction area, and in a case where there is an imaging instruction area, returns a response including information (hereinafter, referred to as "imaging instruction area information") indicating the imaging instruction area to the in-vehicle device 20. The imaging instruction area information includes, for example, an ID of a POI (hereinafter, referred to as a "POI_ID") corresponding to the imaging instruction area and information (area range) indicating a range of the imaging instruction area. In a case where there is a plurality of imaging instruction areas, imaging instruction area information of each imaging instruction area is included in the response. In a case where there is no imaging instruction area, the center 10 returns, to the in-vehicle device 20, a response indicating that there is no imaging instruction area.

In a case where the imaging instruction area information is not included in the response from the center 10 (in S105, No), the processing procedure of FIG. 5 ends. In a case where the imaging instruction area information is included in the response from the center 10 (in S105, Yes), the positional information analysis unit 24 specifies, with reference to the positional information storage unit 212, the date and time on which the vehicle 40 passes through any imaging instruction area indicated by the imaging instruction area information and a traveling direction when the vehicle 40 passes through the imaging instruction area (S106). That is, the positional information of any imaging instruction area is searched from the history of the positional information stored in the positional information storage unit 212, and the date and time and the traveling direction stored in association with the positional information are acquired. In a case where a recording interval of the positional information is extremely short (minute), a plurality of pieces of positional information is searched for single passage through a certain imaging instruction area. In this case, a plurality of dates and times and traveling directions corresponding to the searched positional information is acquired.

In a case where the corresponding date and time and traveling direction are not specified, that is, in a case where the vehicle 40 does not pass through any imaging instruction area (in S107, No), the processing procedure of FIG. 5 ends. In a case where the corresponding date and time and traveling direction are specified (in S107, Yes), that is, in a case where the vehicle 40 passes through any imaging instruction area, the positional information analysis unit 24 notifies the image extraction unit 23 of the POI_ID, one or more pieces of positional information in the imaging instruction area, the date and time of each piece of positional information, and the traveling direction of the vehicle 40 at a position related to each piece of positional information for each imaging instruction area.

The image extraction unit 23 extracts a still image corresponding to each notified date and time from the moving image stored in the image storage unit 211 (S108). All still images (that is, all images successively captured in one imaging instruction area) corresponding to all dates and times notified from a positional information notification unit are extracted from the moving image. At this time, in a case where all still images corresponding to all dates and times notified from the positional information notification unit are extracted and the amount of data becomes extremely large, the still images to be extracted may be thinned. Thinning may be performed based on, for example, distance or time. For example, still images with a traveling distance at an interval of 1 m may be extracted. The still images at an interval of 1 m can be calculated from a speed and a traveling time of the vehicle 40. However, it is desirable that a plurality of still images is extracted for one imaging instruction area.

For each imaging instruction area where the still images are extracted, the image extraction unit 23 transmits, to the center 10, information (hereinafter, referred to as "imaging information") including the POI_ID corresponding to the imaging instruction area, one or more still images (hereinafter, simply referred to as "image data") extracted for the imaging instruction area, positional information of an imaging position of each piece of image data, an imaging date and time of each piece of image data, and a traveling direction at the time of capturing each piece of image data (S109).

Transmission of the imaging information may be performed in a range capable of transmitting within a time from when an ACC-OFF operation occurs until the accessory power supply is actually turned off. Specifically, in a case where there is a need to transmit a plurality of pieces of imaging information, for example, imaging information may be transmitted in order from imaging information related to an imaging instruction area with relatively high priority included in the response received in Step S104. Imaging information that cannot be transmitted may be transmitted at the time of next ACC-OFF.

Vehicle information including image data when the vehicle 40 is positioned outside an imaging instruction area may be transmitted to the center 10. For example, vehicle information including image data at a given time interval during traveling of the vehicle 40 may be transmitted to the center 10. In this case, for example, the vehicle information acquisition unit 11 of the center 10 may extract solely the vehicle information in the imaging instruction area. However, as described above, the vehicle information related to the imaging instruction area is to be transmitted, whereby it is possible to reduce a network load, a processing load of the center 10, or the like.

A processing procedure that the center 10 executes with reception of vehicle information transmitted from the in-vehicle device 20 in Step S103 of FIG. 5 will be described. FIG. 6 is a flowchart illustrating an example of a processing procedure that the center 10 executes with reception of vehicle information.

In a case where vehicle information transmitted from the in-vehicle device 20 is received, the vehicle information acquisition unit 11 of the center 10 stores a record including the vehicle information in the vehicle information storage unit 111 (S201).

FIG. 7 is a table showing a configuration example of the vehicle information storage unit 111. As shown in FIG. 7, the vehicle information storage unit 111 stores the vehicle information including the vehicle ID transmitted from each vehicle 40 where ACC-OFF occurs, the positional information, an image captured in a parking position, and the like in association with the date and time on which the vehicle information is received. Hereinafter, information also including the date and time is referred to as vehicle information.

The imaging instruction area transmission unit 13 determines whether or not one or more pieces of imaging instruction area information are stored in the imaging instruction area storage unit 114 (S202). In a case where one or more pieces of imaging instruction area information are stored in the imaging instruction area storage unit 114 (in S202, Yes), the imaging instruction area transmission unit 13 returns a response including all pieces of imaging instruction area information stored in the imaging instruction area storage unit 114 to the in-vehicle device 20 as a transmission source of the vehicle information (S203).

In a case where the imaging instruction area information is not stored in the imaging instruction area storage unit 114 (in S202, No), the imaging instruction area transmission unit 13 returns, to the in-vehicle device 20 as a transmission source of the vehicle information, a response indicating that there is no imaging instruction area (S204).

A processing procedure that the statistical analysis unit 12 executes in a batch based on information stored in the vehicle information storage unit 111 will be described. FIG. 8 is a flowchart illustrating an example of a processing procedure of specification processing of an imaging instruction area. The processing procedure of FIG. 8 is executed, for example, for each given period T1, such as one week.

In Step S301, the statistical analysis unit 12 acquires the vehicle information received for the last given period T1 from the vehicle information storage unit 111. Specifically, a vehicle information group with a value of the date and time included the given period T1 is acquired from the vehicle information storage unit 111.

The statistical analysis unit 12 specifies, based on the positional information included in each piece of vehicle information acquired in Step S301, a POI corresponding to the vehicle information, and associates the specified POI with each piece of vehicle information (S302). That is, a POI that is estimated as the parking position of the vehicle 40 related to the vehicle information is specified. A specification method of the POI is not limited to a predetermined method. For example, a POI closest to a position indicated by the positional information included in the vehicle information may be specified as the POI corresponding to the vehicle information. The closest POI can be specified based on the positional information of the POI. The positional information of each POI can be specified with reference to the map information storage unit 112. That is, the map information storage unit 112 stores POI information including the POI_ID, name, category (genre), position (latitude and longitude), and the like of a store, a facility, or the like for each POI.

Alternatively, a range of each POI may be estimated by estimating a boundary between POIs. That is, while a POI is information (one-dimensional information) of a point, for each POI, the range (two-dimensional information) of the POI may be estimated. For example, a circular area with a predetermined distance (for example, several meters) centering on the POI as a radius, a rectangular area having a side of a predetermined distance (for example, several meters) with the POI as an intersection point of diagonals, or the like may be defined as the range of each POI. In this case, in regard to a portion where the ranges of a plurality of POIs overlap each other, a boundary may be defined by an intermediate position between the POIs. In this case, a POI corresponding to a range including positional information included in vehicle information may be specified as the POI corresponding to the vehicle information.

Alternatively, information indicating a two-dimensional contour (boundary) of a building corresponding to each POI may be stored in the map information storage unit 112. In this case, a POI positioned within a boundary including positional information included in vehicle information may be specified as the POI corresponding to the vehicle information.

Improvement of the specification accuracy of a POI may be achieved based on an image (that is, an image captured at the time of parking) included in vehicle information. Specifically, in a case where a plurality of POIs is specified for one piece of vehicle information by any method described above (for example, in a case where there is a plurality of closest POIs), a store name and the like may be specified by performing character recognition or signboard recognition (recognition of design or the like of a signboard) on the image, and the POI corresponding to the vehicle information may be uniquely specified.

In all methods, one POI is specified for one piece of vehicle information, and information (POI information) of the specified POI is associated with each piece of vehicle information.

The statistical analysis unit 12 totalizes the number of pieces of vehicle information by time slot and by day of week for each vehicle information group with common associated POI information, and records a totalization result in the totalization result storage unit 113 (S303).

FIG. 9 is a table showing a configuration example of the totalization result storage unit 113. As shown in FIG. 9, the totalization result storage unit 113 stores a table (hereinafter, referred to as a "totalization table") in which the totalization result in the given period T1 is recorded for each given period T1. A record of the totalization table includes a POI_ID, a time slot classification, a day-of-week classification, a vehicle ID array, the number of vehicles in ACC-OFF state, and the like.

The POI_ID is an ID of a POI. The time slot classification is a classification of a time slot. For example, a time slot classification, such as afternoon (14:00 to 15:00) and evening (17:00 to 18:00), may be set, or a time slot that is obtained by dividing 24 hours by a time width of one hour or the like may be set. The day-of-week classification may be Monday, Tuesday, Wednesday, Thursday, Friday, Saturday, and Sunday, or may be a classification of a regular closing day and a day other than the regular closing day. The regular closing day of each POI may be included in the POI information stored in the map information storage unit 112 or may be stored in another storage unit. The vehicle ID array is an array of the vehicle IDs included in each piece of vehicle information with the associated POI information and date and time corresponding to the POI_ID, the time slot classification, and the day-of-week classification in the vehicle information group. That is, the vehicle ID array includes the vehicles ID of the vehicles 40 that are estimated to be parked at the POI related to the POI_ID for the last given period T1. However, in the vehicle ID array, duplication of the same vehicle ID is eliminated. This is to ascertain a use situation of a store or the like by an unspecified person. That is, this is because it is considered that, in a case where all of the vehicle IDs included in the vehicle ID array are identical, solely a specified person is parking the vehicle, and it is not appropriate to perform determination of the presence or absence of a store or the like based on the vehicle ID array. The number of vehicles in the ACC-OFF state is the number of vehicle IDs included in the vehicle ID array. That is, the number of vehicles in the ACC-OFF state is the number of vehicles 40 (however, a duplicate count of the same vehicle is excluded) that are estimated to be parked at the POI related to the POI_ID for the last given period T1. Elimination of the duplicate count of the same vehicle is not an indispensable requirement. Accordingly, the duplicate count may be permitted.

In a case where information regarding date and time of an event or date and time of renewal opening can be acquired, vehicle information corresponding to date and time on which an event is held or date and time on which there is renewal opening or the like may be excluded from a totalization target. This is because, in a case where there is an event, renewal opening, or the like in the vicinity, the number of parked vehicles may deviate from that during a normal time, and in a case where a record with the number of parked vehicles deviating from that during the normal time is included in a totalization target, a value that is not appropriate as the number of parked vehicles during the normal time may be obtained.

The statistical analysis unit 12 specifies an upper limit and a lower limit of the number of vehicles in the ACC-OFF state based on a past totalization table by POI, time slot classification, and day-of-week classification related to each record of a latest totalization table (that is, a totalization table for the last given period T1) (S304). Here, the past totalization table refers to (n-m)th (where m>1) to (n−1)th totalization tables in a case where the latest totalization table is an n-th totalization table. A value of m may be set in a predetermined manner. The upper limit of the number of vehicles in the ACC-OFF state refers to the maximum value of the number of vehicles in the ACC-OFF state in the corresponding record among the (n-m)th to (n−1)th totalization tables. The lower limit of the number of vehicles in the ACC-OFF state refers to the minimum value of the number of vehicles in the ACC-OFF state in the corresponding record among the (n-m)th to (n−1)th totalization tables.

The statistical analysis unit 12 extracts, from each record of the latest totalization table, a record having the value of the number of vehicles in the ACC-OFF state outside a range defined by the upper limit and the lower limit specified for the record, and specifies the POI related to the POI_ID of the extracted record as an imaging target (S305). This is because it is considered that the POI described above undergoes large change in the number of parked vehicles recognized for the last given period and may go out of business, or the like. The records of the totalization table are stored in terms of the POI, the time slot classification, and the day-of-week classification, not for each POI. Accordingly, a plurality of records may be stored in the totalization table for one POI. The POI described above may have at least one record outside the range of the upper limit and the lower limit as a condition of being an imaging target, may have all records outside the range of the upper limits and the lower limits as a condition of being an imaging target, or may have records of a predetermined ratio or more outside the range of the upper limits and the lower limits as a condition of being an imaging target.

For each POI to be an imaging target, the statistical analysis unit 12 defines a peripheral area including the position of the POI as an imaging instruction area, and records imaging instruction area information indicating the imaging instruction area in the imaging instruction area storage unit 114 (S306).

Figures 10, 11:
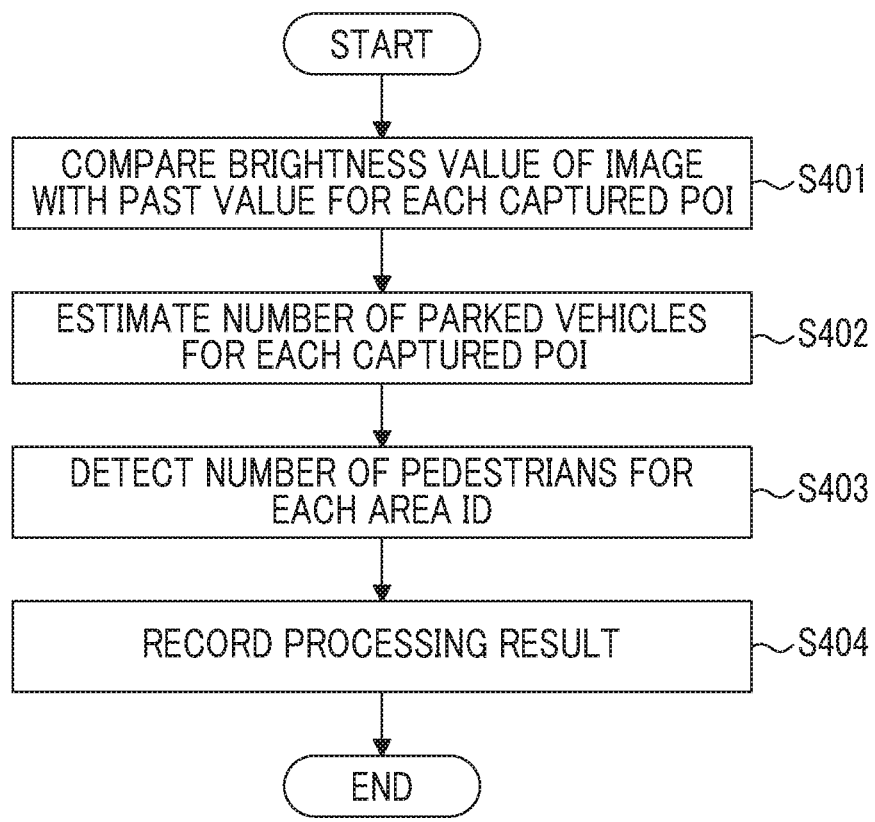
FIG. 10 is a table showing a configuration example of an imaging instruction area storage unit.
FIG. 11 is a flowchart illustrating an example of a processing procedure of analysis processing of image data captured in the imaging instruction area.

FIG. 10 is a table showing a configuration example of the imaging instruction area storage unit 114. As shown in FIG.

10, each record of the imaging instruction area storage unit 114 includes a POI_ID, an area range, a priority, and the like.

The POI_ID is a POI_ID of a POI to be an imaging target. The area range is information indicating the range of the imaging instruction area regarding the POI. The area range may be specified by a center point and a radius in a case of, for example, a circular area. In this case, the center point may be specified by the positional information of the POI. Alternatively, in a case where the area range is a rectangular area, the area range may be specified by the latitude and longitude of each of diagonal vertexes (upper right and lower left vertexes or upper left and lower right vertexes). For example, in Step S303, in a case where the area is specified for each POI, a range expanded to the periphery of the range by a predetermined amount may be defined as an area range. It is preferable that a road in the periphery of the POI is included in the area range. This is to allow an image including a facility or the like corresponding to the POI to be captured during traveling in the road in the periphery of the POI.

The priority is a priority between imaging instruction areas. The priority may be determined, for example, in Step S305. That is, an imaging instruction area related to a POI having a larger degree of being outside the upper limit and the lower limit may be given a high priority.

The imaging instruction area information described above is included in the response returned in Step S203 of FIG. 6.

The processing procedure of FIG. 8 is a processing procedure for the purpose of specifying a POI where the occurrence frequency of ACC-OFF based on the history of the ACC-OFF point (parking position) of each vehicle 40 tends to decrease and specifying a range including the POI as an imaging instruction area. An imaging instruction area may be specified by a processing procedure other than the processing procedure of FIG. 8 as long as the same purpose can be achieved.

For example, one or more vehicle IDs with ACC-OFF detected in a specific POI continuously (for example, at regular intervals) may be specified based on the vehicle ID array of the past totalization result table, and a peripheral area including a POI where one or more vehicle IDs are not included in the latest totalization result table or several totalization result tables before the latest totalization result table may be specified as an imaging instruction area. This is because it is considered that a store not visited by a regular customer may go out of business.

In Step S109 of FIG. 5, a processing procedure that the center 10 executes with reception of imaging information (the POI_ID, one or more pieces of image data, the date and time, the traveling direction, and the like) transmitted from the in-vehicle device 20 will be described.

FIG. 11 is a flowchart illustrating an example of a processing procedure of analysis processing of image data captured in an imaging instruction area.

In Step S401, in a case where the imaging information transmitted from the in-vehicle device 20 is received, for each piece of received imaging information, the image processing unit 14 determines the presence or absence of change in brightness value (change in lightness) by comparing a brightness value of image data included in the imaging information with a past brightness value registered in a brightness value table stored in the image processing result storage unit 115 (each captured POI). The brightness value of image data included in the imaging information is an average value of brightness values of pixels of any image data included in the imaging information. Alternatively, the brightness value may be, for example, an average value of brightness values of a portion in image data corresponding to the vicinity of the POI related to the POI_ID included in the imaging information. A position of the POI in the image data can be estimated based on the traveling direction included in the imaging information, positional information of the POI, positional information of an imaging position of the image data, and a traveling direction of the vehicle 40 at the imaging position. A peripheral portion including the position may be specified as a portion corresponding to the vicinity of the POI. Alternatively, for example, any area in a case where image data is divided into four parts or the like may be specified as a portion corresponding to the vicinity of the POI.

The past brightness value registered in the brightness value table is an average value of brightness values of image data captured in a time slot corresponding to imaging date and time of imaging information received this time among image data included in past imaging information relating to the POI corresponding to the imaging information.

FIG. 12 shows a configuration example of the brightness value table. As shown in FIG. 12, the brightness value table stores a POI_ID and brightness values 1 to 4 for each imaging instruction area where the imaging information is received in the past.

The POI_ID is a POI_ID of a POI corresponding to the imaging instruction area. The brightness value 1 is a brightness value of image data captured in a time slot during morning on a business day of the POI. The brightness value 2 is a brightness value of image data captured in a time slot during evening on the business day of the POI. The brightness value 3 is a brightness value of image data captured in a time slot during morning on a regular closing day of the POI. The brightness value 4 is a brightness value of image data captured in a time slot during evening on the regular closing day of the POI. Each brightness value is an average value of brightness values of pixels of each piece of image data (or of an image of a portion corresponding to the vicinity of the POI in each piece of image data).

In Step S401, in a case where the imaging date and time of image data included in the received imaging information corresponds to morning on the business day of the POI related to the POI_ID included in the imaging information, the brightness value of image data is compared with the brightness value 1 stored in the brightness value table regarding the POI_ID. In a case where the imaging date and time of image data included in the imaging information corresponds to evening on the business day of the POI related to the POI_ID included in the imaging information, the brightness value of image data is compared with the brightness value 2 stored in the brightness value table regarding the POI_ID. In a case where the imaging date and time of image data included in the imaging information corresponds to morning on the regular closing day of the POI related to the POI_ID included in the imaging information, the brightness value of image data is compared with the brightness value 3 stored in the brightness value table regarding the POI_ID. In a case where the imaging date and time of image data included in the imaging information corresponds to evening on the regular closing day of the POI related to the POI_ID included in the imaging information, the brightness value of image data is compared with the brightness value 4 stored in the brightness value table regarding the POI_ID. The regular closing day of each POI may be acquired from the map information storage unit 112. Distinction between morning and evening may be made by time slots determined in advance.

After comparison of the brightness values regarding image data included in the received imaging information, the brightness value to be a comparison target in the brightness value table may be substituted with the brightness value of image data. That is, the latest brightness value of image data may be registered in the brightness value table. In a case where the brightness value to be a comparison target is not stored in the brightness value table regarding image data, the brightness value of image data is registered in a field of the brightness value table where the brightness value to be a comparison target should be stored.

In Step S401, in a case where the comparison of the brightness values is performed, the presence or absence of change in brightness value is output. At this time, a threshold α to the difference between the brightness values may be set in advance, in a case where there is a difference that exceeds the threshold α, determination may be made to be "(change) present", and in a case where the difference between the brightness values is within the threshold α, determination may be made to be "(change) absent". In a case where the comparison of the brightness values is not performed, that is, in a case where the brightness value to be a comparison target is not registered in the brightness value table, "unclear" is output as a determination result.

For each piece of received imaging information, the image processing unit 14 estimates the number of parked vehicles in the POI related to the imaging information based on image data or the like included in the imaging information (S402). For example, in a case where a plurality of pieces of image data is included in certain imaging information, the image processing unit 14 specifies the vehicle 40 (hereinafter, referred to as a "stopped vehicle") being not moved in image data. The image processing unit 14 defines the vehicle 40 positioned in the vicinity of the POI related to the imaging information in image data among the stopped vehicles as a parked vehicle in the POI, and counts the number of parked vehicles. A specification method of the vicinity of the POI in image data as described in Step S401.

For each piece of received imaging information, the image processing unit 14 estimates the number of pedestrians who have the POI related to the imaging information as a destination based on image data or the like included in the imaging information (who are users of a facility related to the POI) (S403). Such estimation of the number of pedestrians may be realized by a method in which the "vehicle 40" is substituted with a "pedestrian" in Step S402. In this way, the number of pedestrians who are queuing in the POI may be estimated.

The image processing unit 14 records the processing results of Steps S401 to S403 in a situation table of the image processing result storage unit 115 for each piece of received imaging information (S404).

FIG. 13 shows a configuration example of the situation table. As shown in FIG. 13, each record of the situation table includes a POI_ID, change in brightness value, the number of parked vehicles, the number of pedestrians, date and time, and the like.

The POI_ID is the POI_ID included in the imaging information. The change in brightness value is the processing result of Step S401 regarding the imaging information, and the value of the change in brightness value is "present", "unclear", and "absent". "Present" indicates that there is change in brightness value. "Unclear" indicates that the presence or absence of change in brightness value is unclear. "Absent" indicates that there is no change in brightness value. The number of parked vehicles is the number of parked vehicles counted in Step S402 regarding the imaging information. The number of pedestrians is the number of pedestrians counted in Step S403 regarding the imaging information. The date and time is the date and time on which a situation (change in brightness value, the number of parked vehicles, the number of pedestrians) indicated by the record is detected. In the date and time, for example, the date and time included in the imaging information may be recorded.

Processing for detecting change (for example, going out-of-business of a store, or the like) in situations of each imaging instruction area (POI) will be described based on the situation table.

Figure 14:
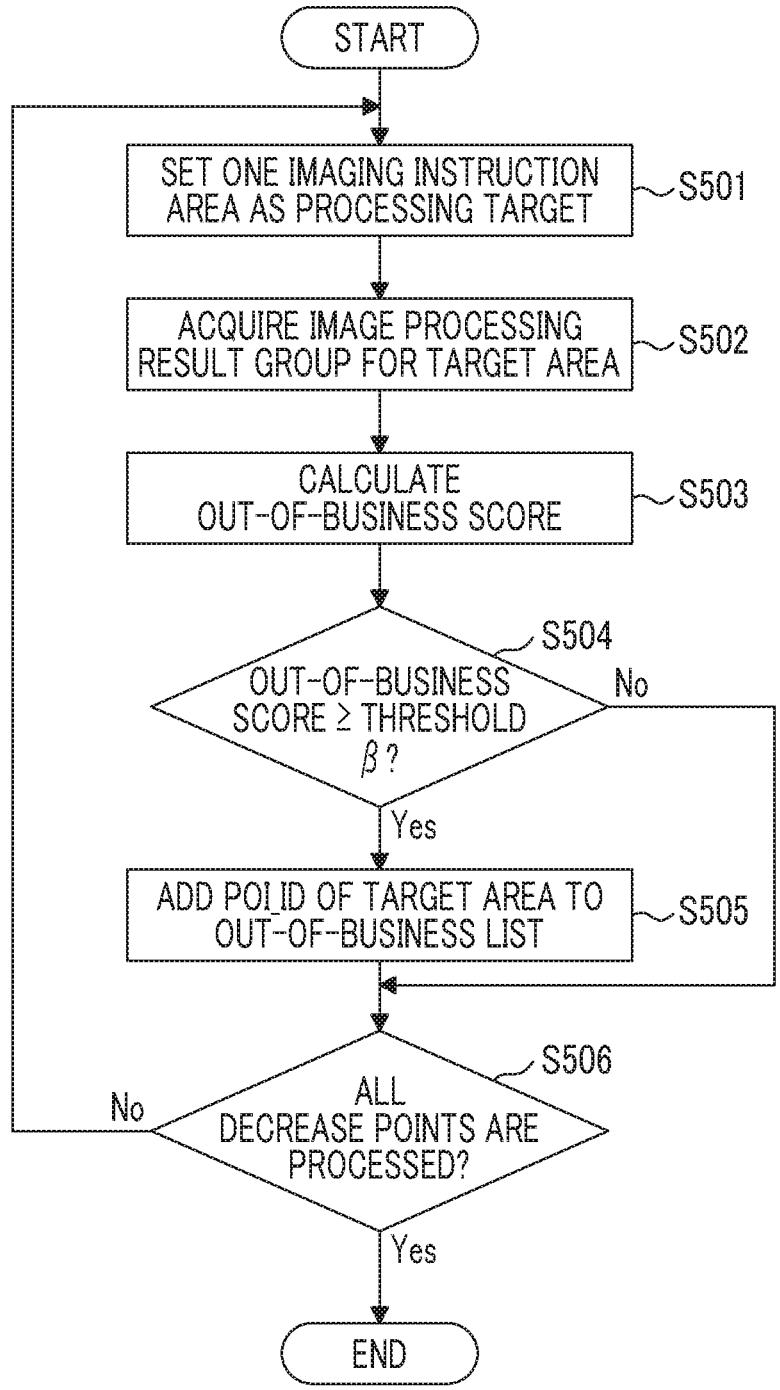
FIG. 14 is a flowchart illustrating an example of a processing procedure of detection processing of change in situations in the imaging instruction area.

FIG. 14 is a flowchart illustrating an example of a processing procedure of detection processing of change in situations of an imaging instruction area. The processing procedure of FIG. 14 is executed in a batch for each given period T2, for example, once for one week. The given period T2 may be equal to the given period T1.

In Step S501, the change detection unit 15 sets one record among the records stored in the imaging instruction area storage unit 114 (FIG. 10) as a processing target. The order of the record to be a processing target is not particularly limited. The record is referred to as a "target area record".

The change detection unit 15 acquires a record group including the POI_ID of the target area record from the situation table (FIG. 13) (S502). At this time, an acquisition target may be limited to records having the date and time included in the last given period T2. Hereinafter, the acquired record group is referred to as a "target situation record group".

The change detection unit 15 calculates an out-of-business score regarding a POI related to target area record based on the target situation record group and a coefficient stored in the coefficient storage unit 116 (S503). The out-of-business score is an index indicating that a facility or the like related to the POI may go out of business or the like (not in business) by a numerical value.

FIG. 15 is a table showing a configuration example of the coefficient storage unit 116. As shown in FIG. 15, the coefficient storage unit 116 stores a change-in-brightness-value coefficient table C1, the-number-of-parked-vehicles coefficient table C2, the-number-of-pedestrians coefficient table C3, and the like. Hereinafter, the tables are simply referred to as "coefficient tables" in a case where no distinction among the tables is made.

In the change-in-brightness-value coefficient table C1, coefficients (change-in-brightness-value coefficients) in a case where change in brightness value is "present", "unclear", or "absent" are stored. In the-number-of-parked-vehicles coefficient table C2, coefficients (the-number-of-parked-vehicles coefficients) in a case where the number of parked vehicles is equal to or greater than X, exceeds zero and is less than X, or is zero are stored. X may be set to a value that the number of parked vehicles is considered to be large. In the-number-of-pedestrians coefficient table C3, coefficients (the-number-of-pedestrians coefficients) in a case where the number of pedestrians is equal to or greater than Y, exceeds zero and is less than Y, or is zero are stored. Y may be set to a value that the number of pedestrians is considered to be large.

In regard to each coefficient, an absolute value of each coefficient becomes a large value in a plus direction in a case where change in situations is highly likely to occur, and the absolute value of each coefficient becomes a large value in a minus direction in a case where change in situations is less likely to occur.

The out-of-business score of the target area record is calculated based on the coefficient tables described above by the following expression.

Out-of-business score=Σ(change-in-brightness-value coefficient+the-number-of-parked-vehicles coefficient+the-number-of-pedestrians coefficient)

Here, Σ means the sum in the target situation record group of (change-in-brightness-value coefficient+the-number-of-parked-vehicles coefficient+the-number-of-pedestrians coefficient) calculated for each record included in the target situation record group. In a case where the out-of-business score becomes a negative value, the out-of-business score may be corrected to zero, and in a case where the out-of-business score exceeds 100, the out-of-business score may be corrected to 100.

The change detection unit 15 compares the out-of-business score with a threshold β (for example, 50) (S504). In a case where the out-of-business score is equal to or greater than the threshold β (in S504, Yes), the change detection unit 15 additionally stores the POI_ID of the target area record in the out-of-business list storage unit 117 (S505). That is, it is detected that the POI related to the POI_ID may go out of business (may undergo change in situations) is detected. In a case where the out-of-business score is less than the threshold β (in S504, No), Step S505 is not performed.

In a case where Steps S501 to S504 or S505 are performed for all records stored in the imaging instruction area storage unit 114 (FIG. 10) (in S506, Yes), the processing of FIG. 14 ends.

In the above description, although an example where all of the brightness value, the number of parked vehicles, and the number of pedestrians are used has been described, the out-of-business score may be calculated based on one or two of the brightness value, the number of parked vehicles, and the number of pedestrians. In this case, the value of the threshold β may be adjusted.

A POI_ID group stored in the out-of-business list storage unit 117 may be notified to the in-vehicle device 20 of each vehicle 40 at a predetermined timing. For example, in the in-vehicle device 20, in a case where a certain POI is set as a destination (target of guidance), the in-vehicle device 20 may inquire the center 10 about whether or not the POI is stored in the out-of-business list storage unit 117. The center 10 may return a response indicating whether or not the POI related to the inquiry is stored in the out-of-business list storage unit 117. In a case where the POI is stored in the out-of-business list storage unit 117, the in-vehicle device 20 may display information indicating that the POI set as the destination may not be present (go out of business).

Figure 16:
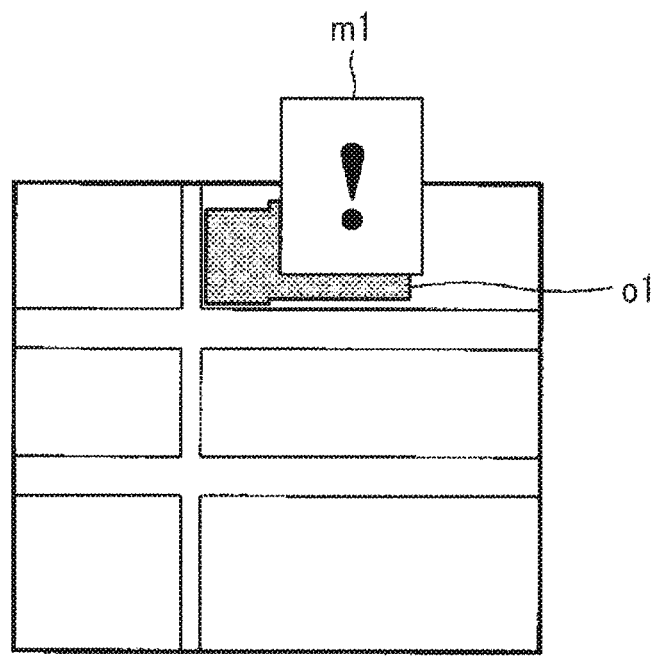
FIG. 16 is a diagram showing a display example on the in-vehicle device at the time of setting a destination.

FIG. 16 is a diagram showing a display example in the in-vehicle device 20 at the time of setting a destination. FIG. 16 shows a map near a destination o1. Here, in a case where a POI_ID of the destination o1 is stored in the out-of-business list storage unit 117, the in-vehicle device 20 may display a mark m1 to notify a driver or the like that the destination o1 may not be present. Such notification may be performed by voice or may be performed by changing (for example, decreasing or darkening) a display form of an icon of the destination o1. Image data finally captured regarding the destination o1 may be acquired from the vehicle information storage unit 111, and image data may be displayed along with the mark m1 or instead of the mark m1.

In the above description, although an example where a POI that may go out of business is specified based on change in the frequency of ACC-OFF has been described, instead of the positional information of the ACC-OFF point, positional information of a position where the vehicle is stopped in a state of ACC-ON for a predetermined time or more, positional information of a position where a state in which the speed decreases to be equal to or lower than a given speed is continued for a predetermined time, or the like may be used.

Alternatively, in a case where a destination is set in the in-vehicle device 20, and when the vehicle 40 arrives at the destination, the vehicle is not brought into ACC-OFF and a destination is changed to a different facility of the same genre as the destination without ACC-OFF, the positional information analysis unit 24 may transmit vehicle information including positional information of the initial destination to the center 10. That is, the positional information may be used instead of the positional information of the ACC-OFF point. This is because it is estimated that the initial destination may go out of business.

As described above, according to the embodiment, an image is captured at a predetermined position (imaging instruction area) based on the vehicle information, and change in situations at the predetermined position is detected based on the image. For this reason, it is possible to detect change in situations based on the image relating to the predetermined position where change in situations is estimated based on the vehicle information. Accordingly, it is possible to improve the detection accuracy of change in situations relating to a facility or the like.

In the embodiment, the vehicle information of the vehicle 40 is acquired in the vicinity of a point where there is a target that a user of an information processing apparatus requests guidance. For this reason, it is possible to detect change in situations at a predetermined position based on an image relating to the vicinity of the point where change in situations is estimated based on the vehicle information, and there is a target that the user of the information processing apparatus requests guidance. Accordingly, it is possible to improve the detection accuracy of change in situations relating to a facility or the like where there is the target that the user of the information processing apparatus requests guidance.

In the embodiment, based on an image captured at a position where there is a target that the user of the information processing apparatus requests guidance, change in situations at the position is detected. Accordingly, it is possible to improve the detection accuracy of change in situations relating to a facility or the like where there is the target that the user of the information processing apparatus requests guidance.

In the embodiment, an image is captured at a position (POI) specified based on positional information of a position where the vehicle 40 is parked, and change in situations at the position is detected based on the image. Here, at the time of using a certain facility or the like, parking of the vehicle is performed in the vicinity of the facility. Then, the position where the vehicle is parked is considered to indicate the position of the used facility or the like. Accordingly, it is possible to improve the detection accuracy of change in situations relating to the facility or the like based on the use situations of the facility or the like.

In the embodiment, a position where a frequency of parking tends to decrease is specified, and the position is notified to the in-vehicle device 20. Here, in a facility or the like where the frequency of parking tends to decrease, a decrease in use frequency is presumed. As the factor of the decrease in use frequency, a possibility of change in situations, such as going out-of-business of the facility, is presumed. Accordingly, it is possible to define an image of a facility or the like with a high possibility of change in situations as a processing target, and to expect reduction in processing load or the like.

In the embodiment, change in situations in a facility or the like is detected based on at least one of the brightness value of an image, the number of parked vehicles extracted from the image, and the number of pedestrians extracted from the image. For this reason, even in a state in which there is a building, such as a facility, it is possible to detect change in situations, such as going out-of-business of the facility, based on the brightness value (lightness) of the facility or the like, the number of parked vehicles in the facility, the number of pedestrians in the vicinity of the facility, and the like. Accordingly, it is possible to improve the detection accuracy of change in situations at the predetermined position.

In the embodiment, the center 10 is an example of an information processing apparatus. The vehicle information acquisition unit 11 is an example of a first acquisition unit. The image processing unit 14 is an example of a second acquisition unit. The change detection unit 15 is an example of a detection unit. The statistical analysis unit 12 is an example of a specification unit.

Although the embodiment of the present disclosure has been described above in detail, an applicable embodiment of the present disclosure is not limited to such a specific embodiment, and various modifications and alterations may be made.

What is claimed is:

1. An information processing apparatus configured to perform communication with an in-vehicle device mounted in a vehicle, the information processing apparatus comprising: at least one computer configured to
    acquire vehicle information through communication with the in-vehicle device, the vehicle information including positional information of a position where the vehicle is parked,
    specify a predetermined position based on the positional information of the position where the vehicle is parked,
    specify a position where a frequency of parking tends to decrease based on a history of positional information of the position where the vehicle is parked,
    notify the in-vehicle device of the position where the frequency of parking tends to decrease as the predetermined position,
    acquire an image captured at the predetermined position with an imaging device mounted in the vehicle based on the vehicle information through communication with the in-vehicle device, and
    detect change in situations at the predetermined position based on the image.

2. The information processing apparatus according to claim 1, wherein the predetermined position is a position in a vicinity of a point where there is a target that a user of the information processing apparatus requests guidance.

3. The information processing apparatus according to claim 2, wherein the predetermined position is a position where there is the target that the user of the information processing apparatus requests the guidance.

4. The information processing apparatus according to claim 1, wherein the computer is configured to detect change in situations at the predetermined position based on at least one of a brightness value of the image, the number of parked vehicles extracted from the image, and the number of pedestrians extracted from the image.

5. The information processing apparatus according to claim 1, wherein, when an accessory power supply of the vehicle is off, the computer is configured to receive the positional information of the vehicle transmitted from the in-vehicle device and to store the positional information, as the history of the positional information, in association with time when the accessory power supply of the vehicle is off.

6. An information processing method comprising:
    with an information processing apparatus configured to perform communication with an in-vehicle device mounted in a vehicle, acquiring vehicle information including positional information of a position where the vehicle is parked;
    with the information processing apparatus, specifying a predetermined position based on the positional information of the position where the vehicle is parked;
    with the information processing apparatus, specifying a position where a frequency of parking tends to decrease based on a history of positional information of the position where the vehicle is parked;
    with the information processing apparatus, notifying the in-vehicle device of the position where the frequency of parking tends to decrease as the predetermined position;
    acquiring an image captured at the predetermined position with an imaging device mounted in the vehicle based on the vehicle information from the in-vehicle device with the information processing apparatus; and
    detecting change in situations at the predetermined position based on the image acquired at the predetermined position.

7. The information processing method according to claim 6, wherein the predetermined position is a position in a vicinity of a point where there is a target that a user of the information processing apparatus requests guidance.

8. The information processing method according to claim 7, wherein the predetermined position is a position where there is the target that the user of the information processing apparatus requests the guidance.

9. The information processing method according to claim 6, wherein the change in situations at the predetermined position is detected based on at least one of a brightness value of the image, the number of parked vehicles extracted from the image, and the number of pedestrians extracted from the image.

10. The information processing method according to claim 6, further comprising, when an accessory power supply of the vehicle is off, with the information processing apparatus, receiving the positional information of the vehicle transmitted from the in-vehicle device and to store the positional information, as the history of the positional information, in association with time when the accessory power supply of the vehicle is off.

11. An information processing system comprising:
    an in-vehicle device mounted in a vehicle; and
    an information processing apparatus configured to perform communication with the in-vehicle device,
    wherein the information processing apparatus includes at least one computer configured to
        acquire vehicle information through communication with the in-vehicle device, the vehicle information including positional information of a position where the vehicle is parked,
        specify a predetermined position based on the positional information of the position where the vehicle is parked,
        specify a position where a frequency of parking tends to decrease based on a history of positional information of the position where the vehicle is parked, notify the in-vehicle device of the position where the frequency of parking tends to decrease as the predetermined position, acquire an image captured at predetermined position with an imaging device mounted in the vehicle based on the vehicle information through communication with the in-vehicle device, and detect change in situations at the predetermined position based on the image.

12. The information processing system s according to claim 11, wherein the predetermined position is a position in a vicinity of a point where there is a target that a user of the information processing apparatus requests guidance.

13. The information processing system according to claim 12, wherein the predetermined position is a position where there is the target that the user of the information processing apparatus requests the guidance.

14. The information processing system according to claim 11, wherein the computer is configured to detect change in situations at the predetermined position based on at least one of a brightness value of the image, the number of parked vehicles extracted from the image, and the number of pedestrians extracted from the image.

15. The information processing system according to claim 11, wherein, when an accessory power supply of the vehicle is off, the computer is configured to receive the positional information of the vehicle transmitted from the in-vehicle device and to store the positional information, as the history of the positional information, in association with time when the accessory power supply of the vehicle is off.

* * * * *